US 8,955,455 B2

(12) United States Patent
Tanaka et al.

(10) Patent No.: US 8,955,455 B2
(45) Date of Patent: Feb. 17, 2015

(54) DEVICE AND METHOD FOR PSEUDONOISE GENERATION

(75) Inventors: Junichi Tanaka, Kumagaya (JP); Masayuki Sugiyama, Kawagoe (JP)

(73) Assignee: Pioneer Corporation, Kanagawa (JP)

( * ) Notice: Subject to any disclaimer, the term of this patent is extended or adjusted under 35 U.S.C. 154(b) by 237 days.

(21) Appl. No.: 13/575,739

(22) PCT Filed: Jan. 29, 2010

(86) PCT No.: PCT/JP2010/051189
§ 371 (c)(1),
(2), (4) Date: Jul. 27, 2012

(87) PCT Pub. No.: WO2011/092833
PCT Pub. Date: Aug. 4, 2011

(65) Prior Publication Data
US 2012/0323442 A1    Dec. 20, 2012

(51) Int. Cl.
*B60Q 1/48* (2006.01)
*B60Q 1/50* (2006.01)
*E04H 6/42* (2006.01)
*B60Q 5/00* (2006.01)
*G10K 15/02* (2006.01)

(52) U.S. Cl.
CPC ............... *B60Q 5/008* (2013.01); *G10K 15/02* (2013.01)
USPC ........................................... 116/28 R; 701/1

(58) Field of Classification Search
USPC ....................................... 116/28 R
See application file for complete search history.

(56) References Cited

U.S. PATENT DOCUMENTS

| 5,237,617 | A | * | 8/1993 | Miller | 381/61 |
| 5,517,173 | A | * | 5/1996 | Cha et al. | 340/404.1 |
| 5,635,903 | A | * | 6/1997 | Koike et al. | 340/441 |
| 5,835,605 | A | * | 11/1998 | Kunimoto | 381/61 |
| 6,356,185 | B1 | * | 3/2002 | Plugge et al. | 340/384.3 |
| 6,725,150 | B1 | * | 4/2004 | Glandian | 701/115 |
| 6,816,597 | B1 | * | 11/2004 | Kawano | 381/17 |

(Continued)

FOREIGN PATENT DOCUMENTS

JP    7-322402    12/1995
JP    11-288291    10/1999

(Continued)

OTHER PUBLICATIONS

International Search Report, PCT/JP2010/051189, May 11, 2010.

*Primary Examiner* — Bhavesh V Amin
(74) *Attorney, Agent, or Firm* — Young & Thompson

(57) ABSTRACT

A derivation part derives accelerator information AR corresponding to accelerator opening angle and rotating speed information ER corresponding to engine rotating speed, based on the traveling information reflecting the operational state of a drive mechanism of a vehicle, acquired by an acquisition part. Subsequently, a generation part generates a pseudo sound signal of a waveform pattern corresponding to a combination of AR and ER. On the other hand, a level control part calculates a level designation value LVC based on the derived rotating speed information. The level control part reduces the pseudo sound signal level at a change rate to decrease discomfortness for the passengers in the vehicle, if ER continuously changes in a predetermined range for a predetermined time period during the calculation of LVC. As a result, pseudo sound that does not impart any discomfort sense to the passengers in the passenger compartment is generated.

13 Claims, 15 Drawing Sheets

(56) References Cited

U.S. PATENT DOCUMENTS

| | | | |
|---|---|---|---|
| 6,859,539 B1 * | 2/2005 | Maeda | 381/86 |
| 6,959,094 B1 * | 10/2005 | Cascone et al. | 381/86 |
| 7,088,829 B1 * | 8/2006 | Schick et al. | 381/71.4 |
| 7,203,321 B1 * | 4/2007 | Freymann et al. | 381/61 |
| 7,606,374 B2 * | 10/2009 | Maeda | 381/61 |
| 7,650,001 B2 * | 1/2010 | Yasushi et al. | 381/61 |
| 7,764,800 B2 * | 7/2010 | Maeda | 381/86 |
| 7,787,633 B2 * | 8/2010 | Costello et al. | 381/61 |
| 7,961,894 B2 * | 6/2011 | Honji | 381/61 |
| 8,059,829 B2 * | 11/2011 | Kobayashi et al. | 381/86 |
| 8,179,234 B1 * | 5/2012 | Atwood | 340/384.3 |
| 8,209,103 B2 * | 6/2012 | Oyama et al. | 701/101 |
| 8,320,581 B2 * | 11/2012 | Hera et al. | 381/86 |
| 8,331,580 B2 * | 12/2012 | Isozaki | 381/86 |
| 8,499,744 B2 * | 8/2013 | Fujikawa | 123/399 |
| 8,526,630 B2 * | 9/2013 | Sakamoto et al. | 381/86 |
| 2004/0170288 A1 * | 9/2004 | Maeda | 381/86 |
| 2008/0192954 A1 * | 8/2008 | Honji et al. | 381/86 |
| 2010/0089307 A1 * | 4/2010 | Kenchington | 116/28 R |
| 2011/0010269 A1 * | 1/2011 | Ballard | 705/26.41 |

FOREIGN PATENT DOCUMENTS

| | | |
|---|---|---|
| JP | 2000-316201 | 11/2000 |
| JP | 2006-193002 | 7/2006 |
| JP | 2006-349844 | 12/2006 |
| JP | 2007-010810 | 1/2007 |

* cited by examiner

| Vehicle Speed (V) | Gear Shift Position (GSD) |
|---|---|
| $0 \sim V_{G1}$ | $GSD_1$ |
| $V_{G1} \sim V_{G2}$ | $GSD_2$ |
| $V_{G2} \sim V_{G3}$ | $GSD_3$ |
| ⋮ | ⋮ |

| Rotational Speed Information (ER) / Accelerator Information (AR) | | $ER_j \sim ER_{j+1}$ | |
|---|---|---|---|
| ⋮ | | | |
| $AR_k \sim AR_{k+1}$ | | Waveform Pattern $WFD_{jk}$ | |
| ⋮ | | | |

DEVICE AND METHOD FOR PSEUDONOISE GENERATION

TECHNICAL FIELD

The present invention relates to a pseudo sound generation device, to a pseudo sound generation method and a pseudo sound generation program, and to a recording medium upon which such a pseudo sound generation program is recorded.

BACKGROUND ART

In recent years, electric automobiles that employ batteries for their drive force and hybrid cars that employ batteries for a portion of their drive force have become widespread. When such an automobile is traveling while using its battery for drive force, the level of drive noise within the passenger compartment is dramatically lower as compared to the case of a prior art gasoline automobile. As a result, it may become impossible appropriately to experience a realistic traveling feeling based upon the engine sound, as is experienced in the case of a gasoline automobile. In many cases the state of affairs is not desirable from the standpoints of safe driving and of enjoyment of a comfortable driving feeling.

By this, a technique has been proposed of generating engine-like pseudo sound in the interior of the passenger compartment corresponding to the conditions of traveling of the vehicle (refer to Patent Document #1, hereinafter termed the "prior art example"). With the prior art technique, when generating engine-like pseudo sound on the basis of traveling information such as engine rotating speed, throttle opening amount (accelerator opening amount), vehicle speed and so on, the audio volume of the sound within the passenger compartment is adjusted according to the result of sound pickup.

PRIOR ART DOCUMENTS

Patent Literature

Patent Document #1: Japanese Laid-Open Patent Publication 2006-193002.

SUMMARY OF THE INVENTION

Problems to be Solved by the Invention

With the technique of the prior art example, if the vehicle is traveling in a constant operational state as for example when it is traveling upon a express way, engine-like pseudo sound sounds continuously within the passenger compartment at an almost constant and comparatively high level. Since the type of engine-like pseudo sound is an artificial sound, accordingly, if such engine-like pseudo sound at a constant level continues to be outputted over a long period of time, there is a tendency for a feeling of discomfort to be imparted to the persons in the vehicle.

By this, a new technique is expected, capable of generating engine-like pseudo sound that does not impart any sense of discomfort to the persons in the vehicle even if the vehicle travels in an almost constant running state. Fulfilling the requirement may be recited as being one of the problems that the present invention is required to solve.

The present invention has been conceived in consideration of the circumstances described above, and its object is to provide a pseudo sound generation device and a pseudo sound generation method that are capable of generating pseudo sound that does not impart any sense of discomfort to the persons in the vehicle riding in the passenger compartment.

Means for Solving the Problems

Considered from a first standpoint, it is a pseudo sound generation device mounted to a vehicle that is equipped with a drive mechanism, comprising: an acquisition part that acquires traveling information reflecting the operational state of said drive mechanism; a derivation part that derives pseudo sound-related information on the basis of said acquired traveling information, including rotating speed information that is corresponding to engine rotating speed; a generation part that generates a pseudo sound signal having a waveform corresponding to said derived pseudo sound-related information; a control part that performs a reduction designation to reduce the level of said pseudo sound signal at a first time rate of change, if said rotating speed information included in said derived pseudo sound-related information is changed within a predetermined range and continued over a predetermined time period; an adjustment part that adjusts the level of said pseudo sound signal according to a designation from said control part; and a speaker that outputs pseudo sound according to the pseudo sound signal of which level has been adjusted by said adjustment part.

And, considered from a second standpoint, it is pseudo sound generation method employed in a pseudo sound generation device mounted to a vehicle, which comprising a drive mechanism and an adjustment part configured to adjusts the level of a pseudo sound signal according to a level designation and a speaker configured to output pseudo sound according to the pseudo sound signal of which level has been adjusted by said adjustment part comprising the steps of: acquiring traveling information reflecting the operational state of said drive mechanism; deriving pseudo sound-related information on the basis of said acquired traveling information, including rotating speed information corresponding to engine rotating speed; generating a pseudo sound signal having a waveform corresponding to said derived pseudo sound-related information; and controlling a level of said pseudo sound signal by performing a reduction designation to reduce the level at a first time rate of change, if said rotating speed information included in said derived pseudo sound-related information is changed within a predetermined range and continued over a predetermined time period.

And, considered from a third standpoint, it is a pseudo sound generation program, characterized in that it causes a calculation unit to execute a pseudo sound generation method of the present invention.

And, considered from a fourth standpoint, it is a recording medium characterized in that a pseudo sound generation program of the present invention is recorded thereupon so as to be readable by a calculation unit.

EMBODIMENTS FOR CARRYING OUT THE INVENTION

In the following, embodiments of the present invention will be explained with reference to the appended drawings. It should be understood that, in the following explanation and drawings, the same reference symbols are appended to elements that are the same or equivalent, and duplicated explanation will be omitted.

The First Embodiment

Figure 1:
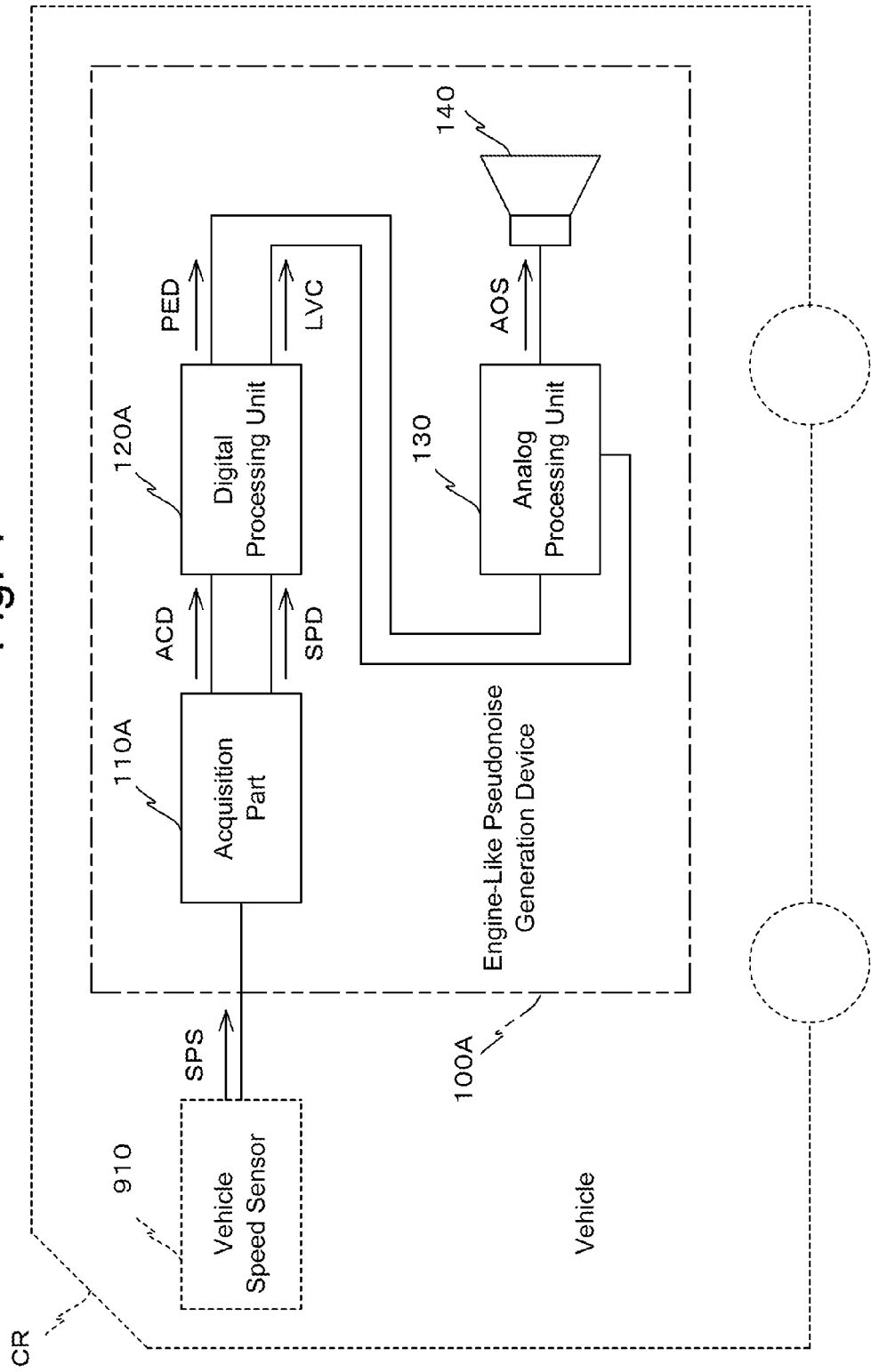
FIG. 1 is a block diagram schematically showing the structure of an engine-like pseudo sound generation device according to a first embodiment of the present invention.

First, the first embodiment of the present invention will be explained with reference to FIGS. 1 through 15.
Configuration The schematic structure of an engine-like pseudo sound generation device 100A that is a pseudo sound generation device according to a first embodiment of the present invention is shown as a block diagram in FIG. 1. As shown in the FIG. 1, the engine-like pseudo sound generation device 100A is mounted to a vehicle CR. And the engine-like pseudo sound generation device 100A comprises an acquisition part 110, a digital processing part 120A, an analog processing part 130, and a speaker 140.

The acquisition part 110A comprises an acceleration sensor to measure the acceleration applying on the vehicle CR. The acquisition part 110A converts the result of measurement by the acceleration sensor into a signal ACD, which has a format that can be processed by the digital processing part 120A, to send it as acceleration information to the digital processing part 120A.

Moreover, the acquisition part 110A receives a measurement signal SPS sent from a vehicle speed sensor 910 mounted on the vehicle CR. Then, the acquisition part 110A sends the vehicle speed information to the digital processing part 120A by converting the measurement signal SPS into a signal SPD having a format that can be processed by the digital processing part 120A to send it to the digital processing part 120A.

Namely, in the first embodiment, the acquisition part 110A is configured in so as to send acceleration information and vehicle speed information for the vehicle CR to the digital processing part 120A, as traveling information for the vehicle CR.

The digital processing part 120A receives the signals ACD and SPD sent from the acquisition part 110A. The digital processing part 120A generates an engine-like pseudo sound signal PED on the basis of these signals ACD and SPD, and calculates a level designation value LVC. Thus generated the engine-like pseudo sound signal PED and the level designation value LVC are sent to the analog processing part 130. Note that the structure of the digital processing part 120A will be described in detail hereinafter.

The analog processing part 130 receives the engine-like pseudo sound signal PED and the level designation value LVC sent from the digital processing part 120A. The analog processing part 130 then generates an output sound signal AOS, an analog signal, which has a level according to the level designation value LVC and has a waveform that reflects the engine-like pseudo sound signal PED. Thus generated output audio signal AOS is sent to the speaker 140. Note that the details of the structure of the analog processing part 130 will be described hereinafter.

The speaker 140 receives the output audio signal sent from the analog processing part 130. The speaker 140 then outputs engine-like pseudo sound according to the output audio signal AOS.

Figure 2:
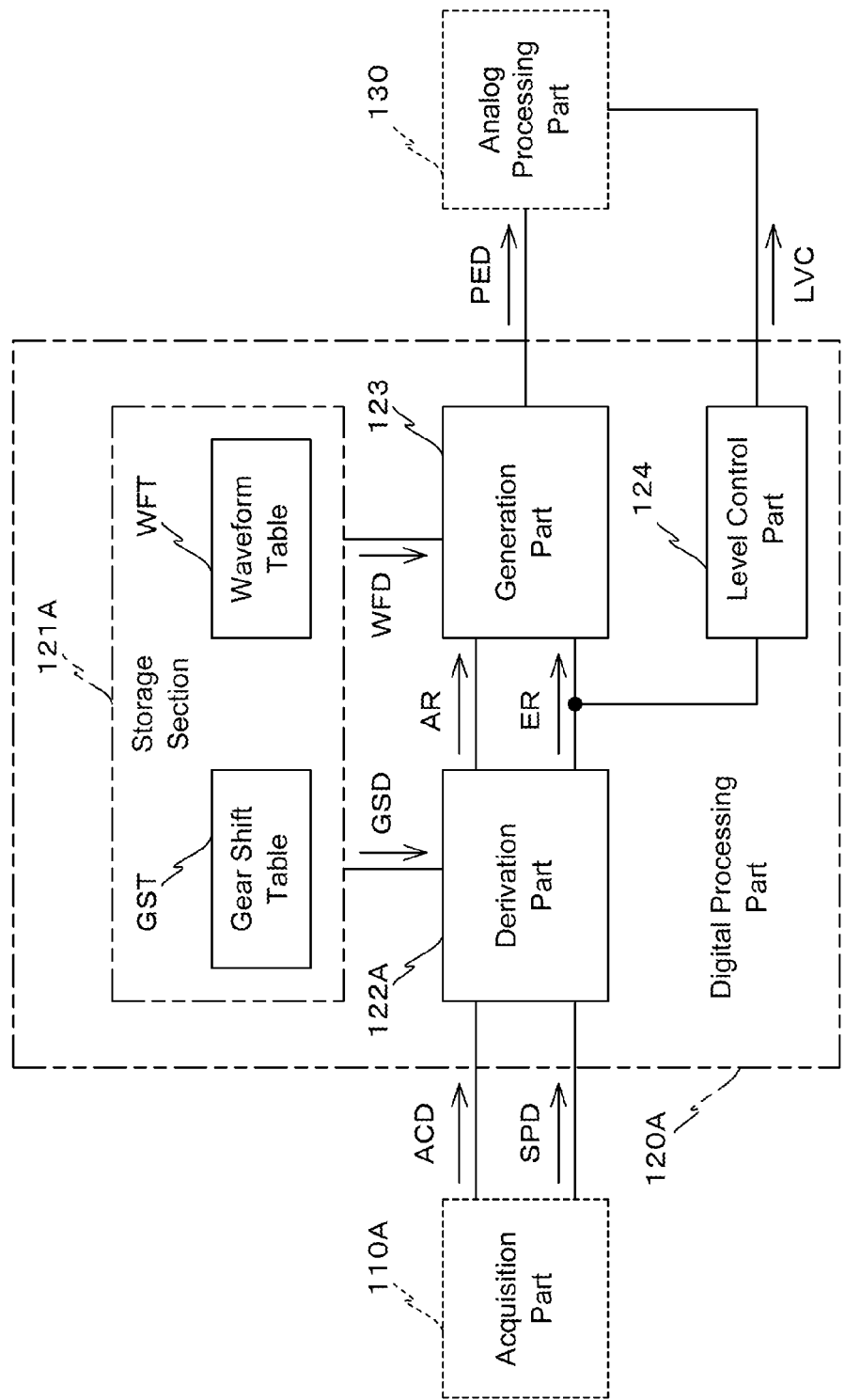
FIG. 2 is a block diagram showing the structure of a digital processing part of FIG. 1.

Next, the structure of the digital processing part 120A will be explained in more detail. As shown in FIG. 2, the digital processing part 120A comprises a storage part 121A, a derivation part 122A, a generation part 123, and a level control part 124 that serves as a control part.

Various kinds of information and data used by the digital processing part 120A are stored in the storage part 121A. The information data stored in the digital processing part 120A includes a gear shift table GST as the first storage part and a waveform table WFT as the second storage part.

Figure 3:
FIG. 3 is a figure showing an example of a gear shift table of FIG. 2.

In the gear shift table GST, gear shift positions relate to the vehicle speeds are registered. In the first embodiment, as shown in FIG. 3, the gear shift positions GSD is related to the vehicle speed V to be registered. The relationship between the vehicle speed and the gear shift position is an average relationship for various types of vehicle CR, the relationship is previously obtained on the basis of experiment, experience, and so on.

Figure 4:
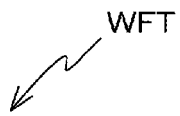
FIG. 4 is a figure showing an example of a waveform table of FIG. 2.

In the waveform table WFT, waveform patterns for engine-like pseudo sound are registered in corresponding to combinations of rotating speed information and accelerator information, wherein the rotating speed information is corresponding to the engine rotating speed, and the accelerator information is corresponding to an accelerator opening angle. In the first embodiment, as shown in FIG. 4, the waveform pattern is registered in relating to each of various combinations of a range of rotating speed information ER and that of accelerator information AR. The relationship between the combination of the range of rotating speed information ER and that of accelerator information AR, and waveform patterns is previously obtained on the basis of experiment, experience, and so on.

The derivation part 122A derives accelerator information AR and rotating speed information ER on the basis of the signals ACD and SPD, both of which are sent from the acquisition part 110A. When the derivation is performed, the derivation part 122A firstly specifies the speed and the acceleration of the vehicle CR on the basis of the signals ACD and SPD.

The derivation part 122A derives the accelerator information AR, which is corresponding to accelerator opening angle, on the basis of the vehicle speed and acceleration that have been specified. The accelerator information AR thus derived is sent to the generation part 123.

Moreover, the derivation part 122A reads data for the gear shift position GSD, which is registered in the gear shift table GST to be related to the specified vehicle speed that. The derivation part 122A then derives engine rotating speed information ER, corresponding to the engine rotating speed, based on the both of the read data GSD and the specified vehicle speed. Thus derived rotating speed information ER is sent to the generation part 123 and the level control part 124.

The generation part receives the accelerator information AR and the rotating speed information ER sent from the derivation part 122A. Subsequently, the generation part 123 reads data WFD, the waveform pattern that is registered in the waveform table WFT being related to the combination of the accelerator information AR and the rotating speed information ER. The generation part 123 generates a digital signal, an engine-like pseudo sound signal PED, on the basis of the data WFD. Thus generated engine-like pseudo sound signal PED is sent to the analog processing part 130.

The level control part 124 receives the rotating speed information ER sent from the derivation part 122A. The level control part 124 then calculates the level designation value LVC on the basis of the rotating speed information ER.

Figure 5:
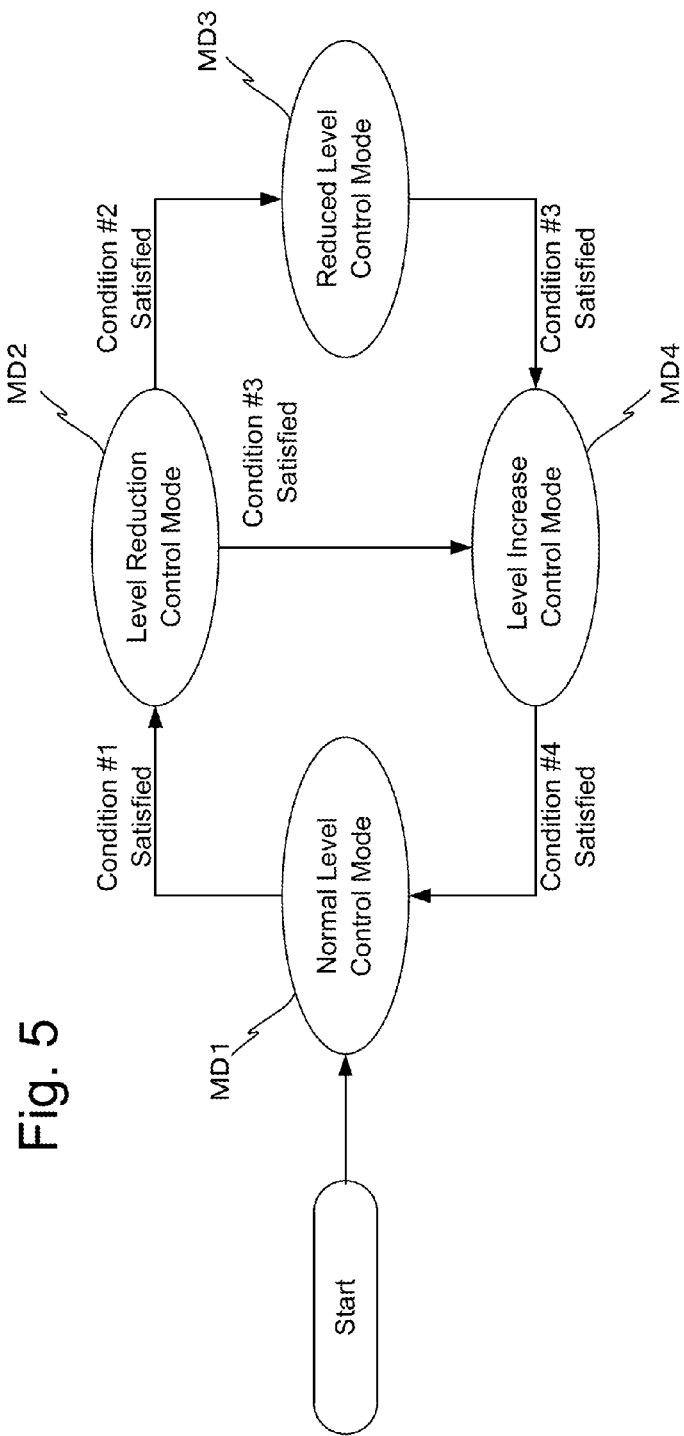
FIG. 5 is a figure showing transitions of a level control part of FIG. 2 between operational modes.

As shown in FIG. 5, the level control part 124 has four operational modes as operational modes: a control mode for normal level MD1 (hereinafter referred to as the "mode MD1"); a control level mode for level reducing MD2 (hereinafter referred to as the "mode MD2"); a control mode for reduced level MD3 (hereinafter referred to as the "mode MD3"); and a control mode for revel increasing MD4 (hereinafter referred to as the "mode MD4"). In the operational mode of the level control part 124, the operation level is changed responding to the feature of the engine rotating speed ER, which is time dependently changing, sent from the derivation part 122A.

Namely, when the operation of the level control part 124 starts due to the power supply being turned on or the like, the level control part 124 starts its operation in the mode MD1. In the mode MD1, the level control part 124 calculates the level designation value LVC(T) [in dB] corresponding to the rotating speed information ER(T) at the time point T, using the following Equation (1):

$$LVC(T)=K_0 \cdot ER(T) \quad (1)$$

$K_0$: a constant.

Note that the constant $K_0$ is previously determined based on the experiment, simulation, experience or the like, corresponding to the type of the vehicle CR from the standpoint of generation of effective engine-like pseudo sound.

If a condition #1, which is that "a state wherein the rotating speed information ER changes within a predetermined range continues for a predetermined time period $T_{TH}$" is satisfied during the operation in the mode MD1, the operational mode transitions to the mode MD2. In the mode MD2, the level designation value LVC(T) [in dB] corresponding to the rotating speed information ER(T) at the time point T is calculated using the following Equation (2), when the time point of transition to the mode MD2 is TS1:

$$LVC(T)=K_0 \cdot ER(T)-K_D \cdot (T-T_{S1}) \quad (2)$$

$K_D$: a positive constant

Note that the predetermined time period $T_{TH}$ previously determined based on the experiment, simulation, experience and so on, responding to the type of the vehicle CR from the standpoint of the extent of discomfort for the uses caused by continuous reproduction of engine-like pseudo sound at approximately same level. Moreover, the constant $K_D$ is previously determined based on the experiment, simulation, experience and so on, responding to the type of the vehicle CR, from the standpoint of reduction of the uncomfortable feeling associate with the reduction of the sound volume level.

During operation in the mode MD2, if a condition #2, which is that "the correction amount of the level reduction ($=K_D \cdot (T-T_{S1})$ has reached the correction amount of a maximum reduction $\Delta VC$ (>0)" is satisfied, the operational mode transitions to the mode MD3. In the mode MD3, the level control part 124 calculates the level designation value LVC(T) [in dB] corresponding to the rotating speed information ER(T) at the time point T using the following Equation (3):

$$LVC(T)=K_0 \cdot ER(T)-\Delta VC \quad (3)$$

Note that the correction amount of the maximum reduction $\Delta VC$ is previously determined based on the experiment, simulation, experience and so on, responding to the type of the vehicle CR, from the standpoint of reduction of the uncomfortable feeling associate with the reduction of the sound volume level.

During operation in the mode MD2 or the mode MD3, if a condition #3, which is that "the rotating speed information ER changed to outside of the predetermined range", is satisfied, the operational mode then transitions to the mode MD4. In the mode MD4, the level control part 124 calculates the level designation value LVC(T) [in dB] corresponding to the rotating speed information ER(T) at the time point T using the following Equation (4) when the time point of transition to the mode MD4 is $T_{S2}$:

$$LVC(T)=K_0 \cdot ER(T)+K_U \cdot (T-T_{S2})-LVC(T_{S2}) \quad (4)$$

$K_U$: a positive constant.

Note that the constant $K_U$ is previously determined based on the experiment, simulation, experience and so on, responding to the type of the vehicle CR, from the standpoint of rapid increase of the sound volume level.

During operation in the mode MD4, if a condition #4, which is that "the correction amount of the level reduction ($=K_U \cdot (T-T_{S2})-LVC(T_{S2})$) reaches 0" is satisfied, the operational mode transitions to the mode MD1.

While performing the above described mode transition, the level control part 124 calculates the level designation value LVC based on the rotating speed information ER. Thus calculated level designation value LVC is sent to the analog processing part 130.

Figure 6:
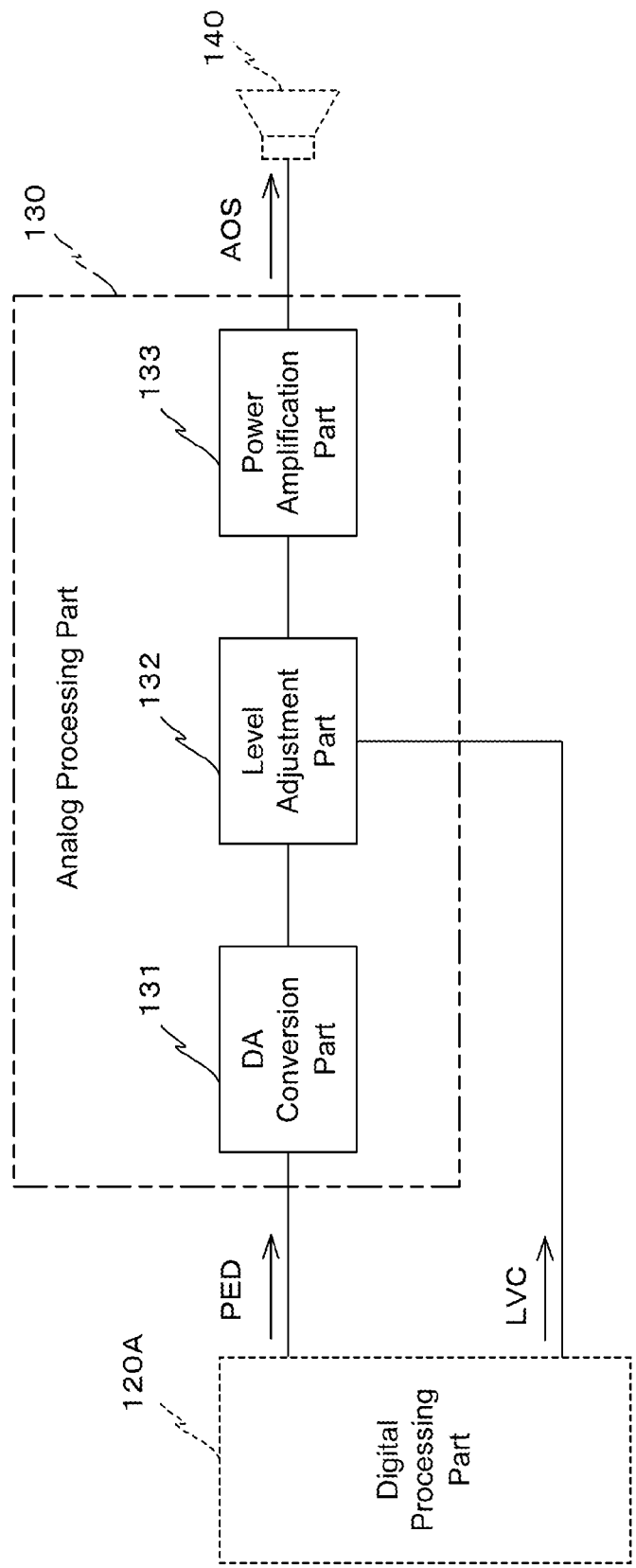
FIG. 6 is a block diagram showing the structure of an analog processing part of FIG. 1.

Next, the structure of the analog processing part 130 will be explained in more detail. As shown in FIG. 6, the analog processing part 130 comprises a DA (Digital to Analog) conversion part 131, a level adjustment part 132 that serves as an adjustment part, and a power amplification part 133.

The DA conversion part 131 is configured to include a DA converter. The DA conversion part 131 receives the engine-like pseudo sound signal PED sent from the digital processing part 120A. The DA conversion part 131 then converts the engine-like pseudo sound signal PED to an analog signal. The analog signal as a result of the conversion by the DA conversion part 131 is sent to the level adjustment part 132.

The level adjustment part 132 is configured to include an electronic volume control element and so on. The level adjustment part 132 performs level adjustment processing upon the analog converted signal sent from the DA conversion part 131, according to the level designation value LVC sent from the digital processing part 120A. The level adjusted signal as a result of adjustment by the level adjustment part 132 is sent to the power amplification part 133.

The power amplification part 133 is configured to include a power amplifier. The power amplification part 133 receives the level adjusted signal from the level adjusted signal. The output audio signal AOS as a result of the amplification by the power amplification part 133 is sent to the speaker 140.

Operation

Next, the operation of the engine-like pseudo sound generation device 100A having the structure as described above will be explained, mainly focused on the processing by the digital processing part 120A, namely, to the processing for derivation of the accelerator information AR and the rotating speed information ER, and to the processing for generation of the engine-like pseudo sound signal PED and for calculation of the level designation value LVC.

In the engine-like pseudo sound generation device 100A, the acquisition part 110A measures the acceleration of the vehicle CR with the acceleration sensor that is internally provided thereto. The acquisition part 110A then converts the result of measurement of the acceleration into the signal ACD that has a format that can be processed by the digital processing part 120A, and sends it to the digital processing part 120A (refer to FIG. 1).

Moreover, the acquisition part 110A receives the measurement signal SPS sent from the vehicle speed sensor 910. The acquisition part 110A then converts the measurement signal SPS into the signal SPD that has a format that can be processed by the digital processing part 120A, and sends it to the digital processing part 120A (refer to FIG. 1).

Figure 7:
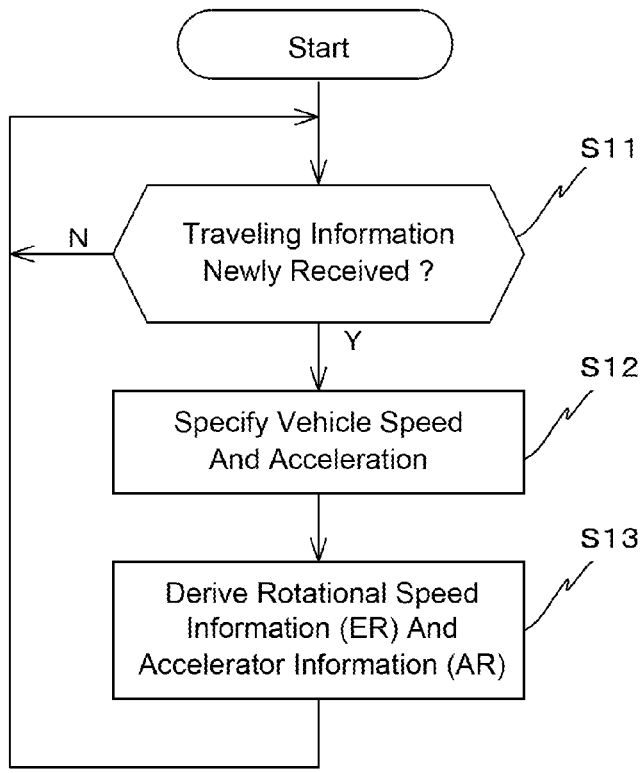
FIG. 7 is a flow chart for explanation of processing for derivation of accelerator information and rotating speed information, in the first embodiment.

Derivation Processing of the Accelerator Information AR and the Rotating Speed Information ER The derivation processing of the acceleration information AR and of the rotating speed information ER is performed by the derivation part 122A of the digital processing part 120A. When the derivation processing is performed, as shown in FIG. 7, firstly in a step S11, the derivation part 122A makes a decision whether the traveling information has newly arrived or not. If the result of the decision is negative (N in the step S11), then the processing of the step S11 is repeated.

When the derivation part 122A newly receives traveling information and the result of the decision in the step S11 becomes affirmative (Y in the step S11), the flow of control then proceeds to a step S12. In the step S12, the derivation part 122A specifies both of the vehicle speed and acceleration based on the traveling information newly sent from the acquisition part 110A.

Next, in a step S13, the derivation part 122A derives the accelerator information AR and the rotating speed information ER based on the specified vehicle speed and specified acceleration. Here, when the accelerator information AR is derived, the derivation part 122A derives the accelerator information AR on the basis of the vehicle speed and acceleration that have been specified. Thus derived accelerator information AR is sent to the generation part 123.

Moreover, when the rotating speed information ER is derived, the derivation part 122A reads the data for the gear shift position GSD that is registered in the gear shift table GS, corresponding to the specified vehicle speed. The derivation part 122A then derives both of the rotating speed information ER based on the read data GSD. Thus derived rotating speed information ER is sent to both of the generation part 123 and to the level control part 124 (refer to FIG. 2). The flow of control then returns to the step S11.

Figure 8:
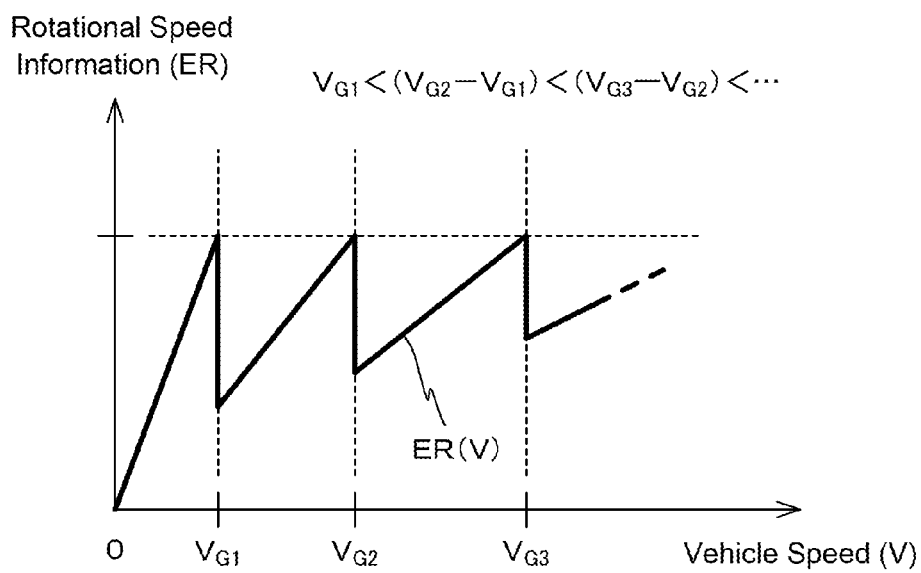
FIG. 8 is a figure showing an example of a relationship between vehicle speed and derived rotating speed information.

Note that the rotating speed information ER is derived based on the vehicle speed, considering the gear shift position in the first embodiment. Therefore, the rotating speed information ER to be derived does not increase monotonically responding to the increase of the vehicle speed; rather, it varied depending on the increase of the vehicle speed as shown in FIG. 8.

Generation Processing of the Engine-Like Pseudo Sound Signal PED

Figure 9:
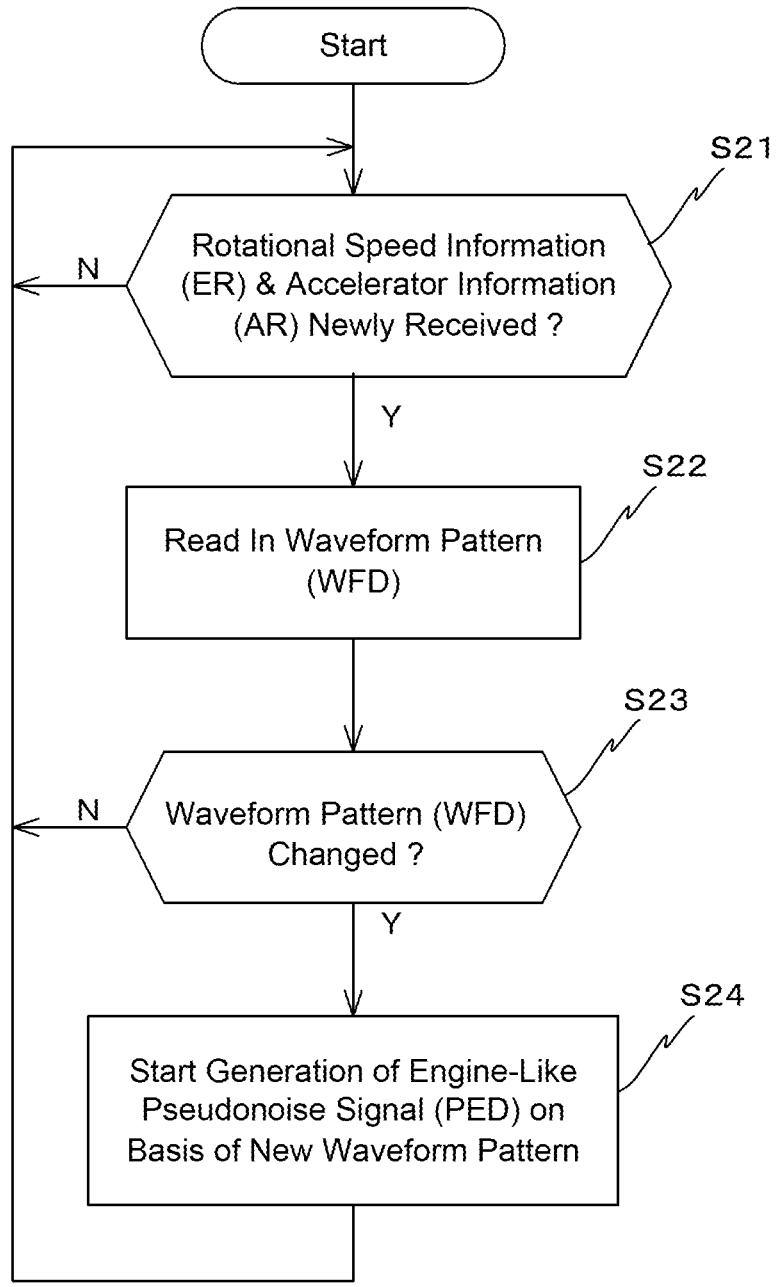
FIG. 9 is a flow chart for explanation of processing for generation of an engine-like pseudo sound signal, in the first embodiment.

The generation part 123 of the digital processing part 120A performs the generation processing of the engine-like pseudo sound signal PED. When the processing, as shown in FIG. 9, firstly in a step S21, the generation part 123 decides whether the accelerator information AR and the rotating speed information ER have been newly received or not. If the decision is negative (N in the step S21), then the processing of the step S21 is repeated.

When the generation part 123 has newly received accelerator information AR and rotating speed information ER, the decision in the step S21 becomes positive (Y in the step 21), and the flow of control proceeds to a step S22. In the step S22, the generation part 123 reads the data WFD of the waveform pattern that is registered in the waveform table WFT being related to the combination of the accelerator information AR and the rotating speed information ER, the combination is newly sent from the derivation part 122A.

Next in the step S23, the generation part 123 decides whether it is necessary to change the waveform pattern based on the decision whether t the waveform pattern newly read is changed from the waveform pattern at the present time point. If the decision is negative (N in the step S23), the flow of control then returns to the step S21.

On the other hand, if the decision in the step S23 is affirmative (Y in the step S23), the flow of control then proceeds to a step S24. In the step S24, the generation part 123 starts the generation of the engine-like pseudo sound signal PED based on the waveform pattern newly read. Thus generated engine-like pseudo sound signal PED is sent to the analog processing part 130 (refer to FIG. 2). The flow of control then returns to the step S21.

Note that the processing for generation of the engine-like pseudo sound signal PED based on the waveform pattern newly read started in the step S24 continues until the next time the step S24 is executed.

Calculating Processing for the Level Designation Value LVC

Figure 10:
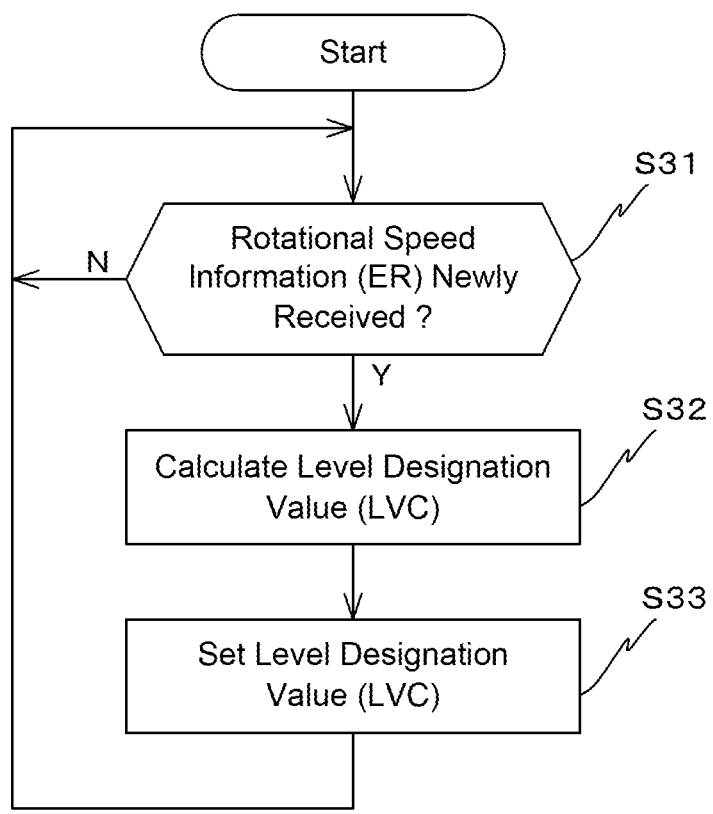
FIG. 10 is a flow chart for explanation of processing for calculation of a level designation value, in the first embodiment.

The processing for calculating the level designation value LVC is performed by the level control part 124 of the digital processing part 120A. During the calculation processing, as shown in FIG. 10, in a step S31, the level control part 124 decide whether the rotating speed information ER has newly been received or not. If the decision is negative (N in the step S31), the processing of the step S31 is then repeated.

However, if the decision in the step S31 is affirmative due to the new reception of the rotating speed information ER by the level control part 124 (Y in the step S31), then the flow of control proceeds to a step S32. In the step S32, the generation part 123 calculates the level designation value LVC while transitioning between the modes MD1 through MD4 as described above on the basis of the rotating speed information ER that has newly been sent from the derivation part 122A.

Next, the level control part 124 sends the level designation value LVC that has been newly calculated to the analog processing part 130 (refer to FIG. 2) in a step S33, the flow of control then returns to the step S31.

Here, an example of the changeover timing for the calculated level designation value LVC is explained with reference to FIGS. 11 through 15. Note that the operational mode of the level control part 124 is initially the mode MD1.

Figure 11:
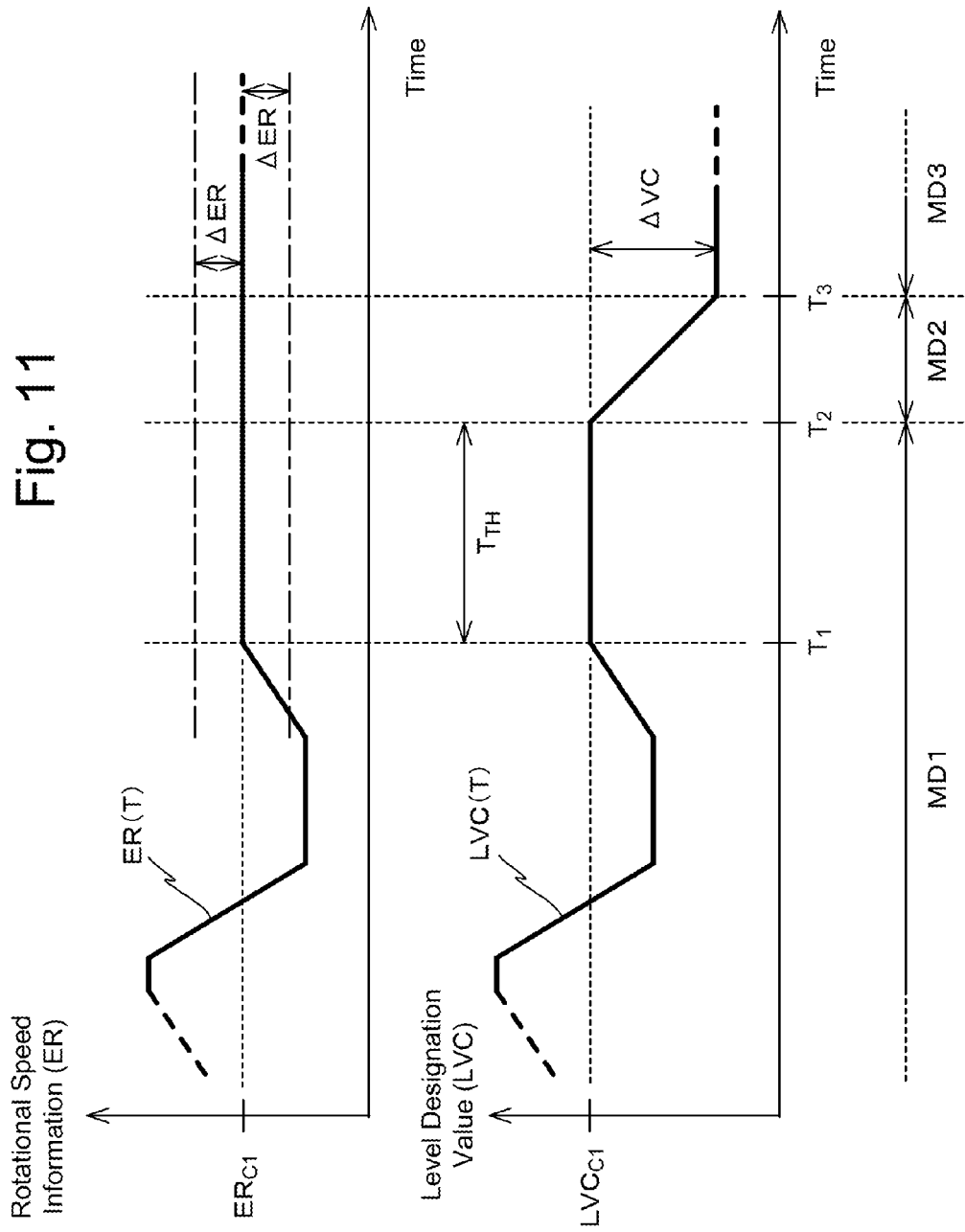
FIG. 11 is the first figure for explanation of change over time of the level designation value.

During the operation in the mode MD1 such as the time point $T_2$ in FIG. 11, the level control part 124 calculates the level designation value LVC(T) at each time point by using the Equation (1) for setting the level reduction correction amount as "0". The operational mode transits to the mode MD2, when the rotating speed information ER(T) changes within a predetermined range (i.e. the range $(ER_{C1}-\Delta ER)\sim(ER_{C1}+\Delta ER)$) continues for just the time period $T_{TH}$ from the time point T1 ($(=T_2-T_{TH})$ and reaches time point $T_2$. Namely, the operational mode transits to the mode MD2, when the rotating speed information ER(T) remains almost constant continues for just the time period $T_{TH}$ to satisfy the condition #1 is satisfied during the operation in the mode MD1.

When the operation mode transit to the mode MD2 at the time point $T_2$, the level control part 124 calculated the level designation value LVC(T) by using the following Equation (5) wherein the time point TS1 is set to $T_2$ in the above-described Equation (2).

$$LVC(T)=K_0 \cdot ER(T)-K_D \cdot (T-T_2) \quad (5)$$

The operational mode transits to the mode MD3, when the time reaches the time point T3 to satisfy the requirement 2, such that "the level reduction correction amount $(K_D \cdot (T-T_2))$ arrived at the maximum level reduction correction amount". When at the time point $T_3$ the operational mode transitions to the mode MD3, then the level control part calculates the level designation value LVC(T) by using Equation (3).

Figure 12:
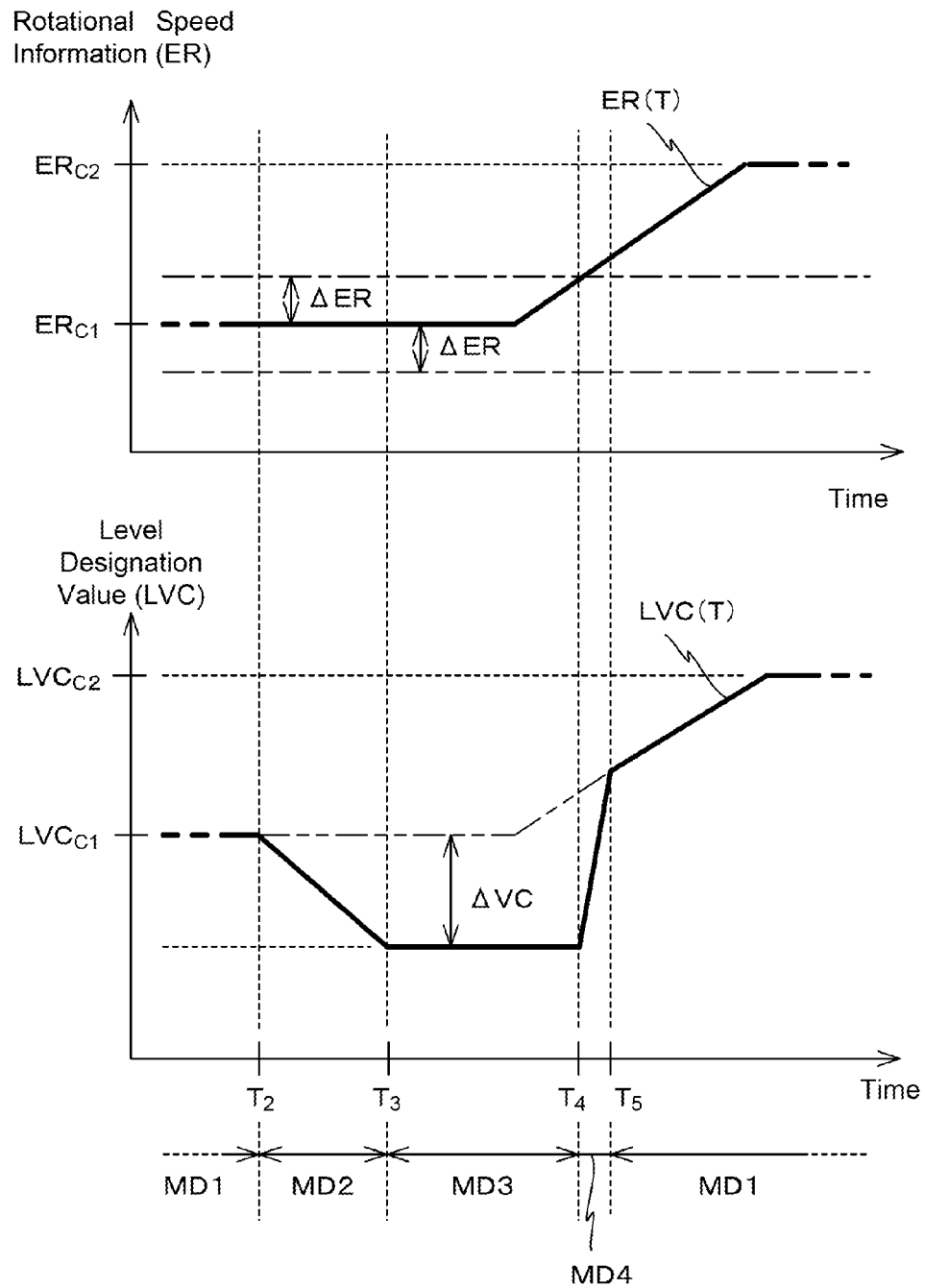
FIG. 12 is the second figure for explanation of change over time of the level designation value.
Figure 13:
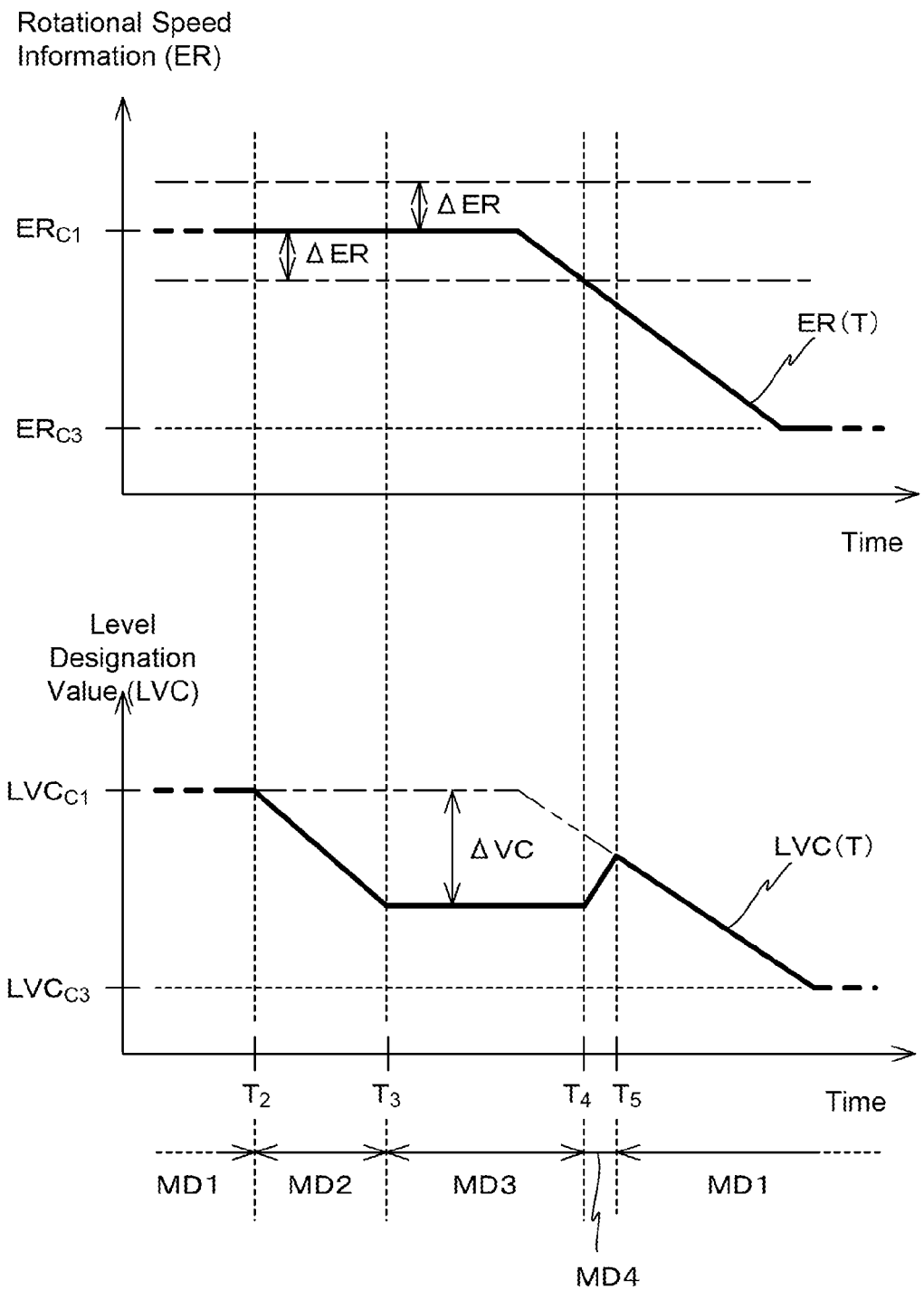
FIG. 13 is the third figure for explanation of change over time of the level designation value.

After that, as shown in FIG. 12 or 13, the operation mode transit to the mode MD4 when the condition #3, "the change of the rotating speed information ER(T) goes outside the predetermined range" is satisfied at the time point $T_4$. By this, when the mode transits to mode MD4, the level control part 124 calculates the level designation value LVC(T) by using the following Equation (5) wherein $LVC(T_{S2})$ is set to $\Delta VC$.

$$LVC(T)=K_0 \cdot ER(T)+K_U \cdot (T-T_4)-\Delta VC \quad (6)$$

When the time point $T_5$ ($=T_4+\Delta VC/K_U$) comes and the condition #4 "the level correction amount $(=K_U \cdot (T-T_4)-\Delta VC)$ has reached 0" is satisfied, the operational mode then transitions to the mode MD1. Thus, the operational mode again returns MD1, the level control part 124 calculates the level designation value LVC(T) at each time point by using the Equation (1) for setting the level reduction correction amount as "0".

Note that FIG. 12 shown an example that change over time of the level designation value LVC(T), when the rotating speed information ER(T) passes the value $(ER_{C1}+\Delta ER)$ and changes towards the value $ER_{C2}$ ($>ER_{C1}+\Delta ER$). Moreover, FIG. 13 shows the change over time of the level designation value LVC(T), when the rotating speed information ER(T) passes the value $(ER_{C1}-\Delta ER)$ and changes towards the value $ER_{C3}$ ($<ER_{C1}-\Delta ER$).

Figure 14:
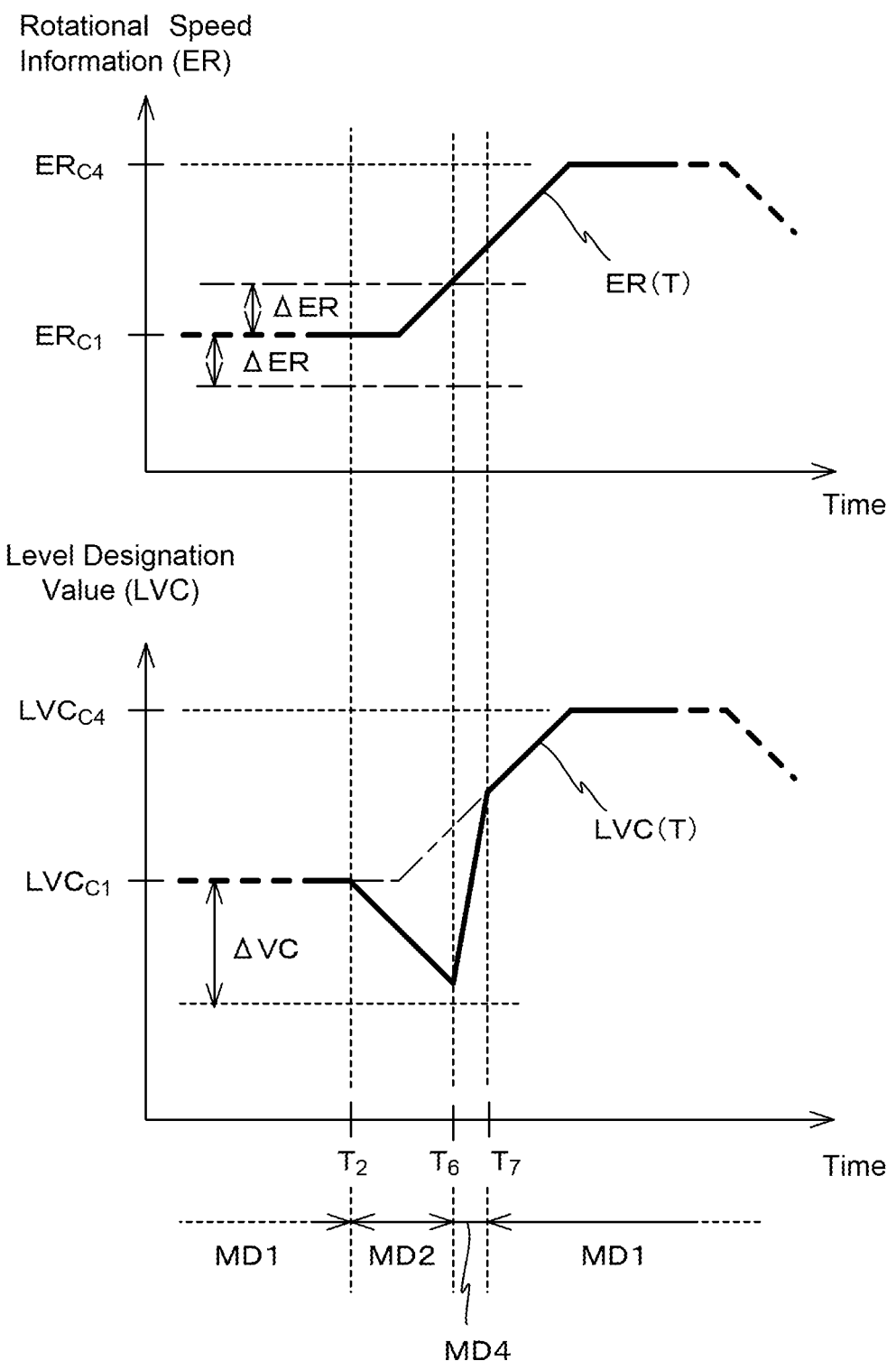
FIG. 14 is the fourth figure for explanation of change over time of the level designation value.
Figure 15:
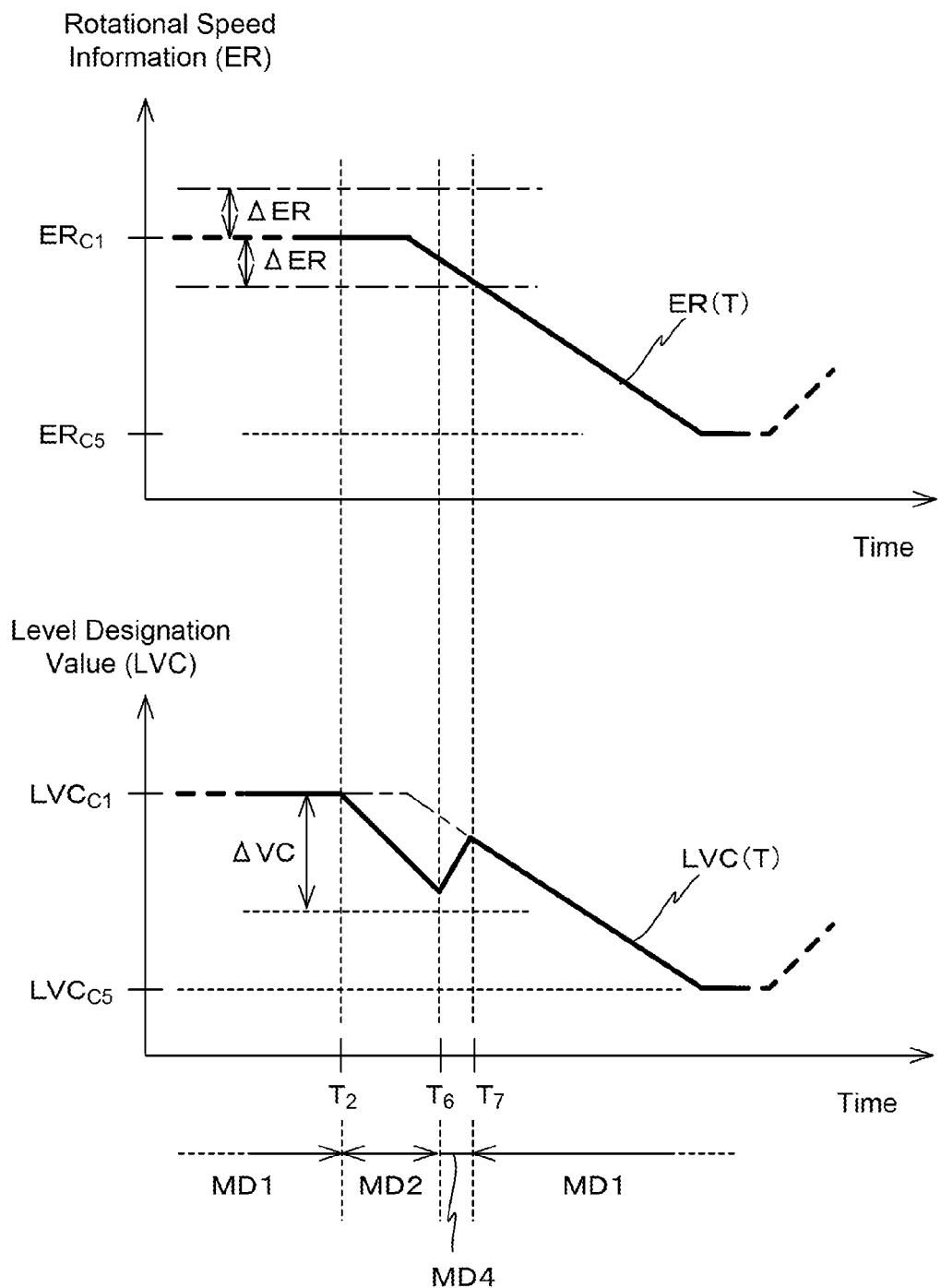
FIG. 15 is the fifth figure for explanation of change over time of the level designation value.

On the other hand, as shown in FIG. 14 or FIG. 15, when at the time point $T_6$ while the mode MD2 is continuing, the condition #3 "the change of the rotating speed information ER(T) goes outside the predetermined range" is satisfied, the operational mode then transitions to the mode MD4. Thus the mode transitions to the mode MD4, the level control part 124 then calculates the level designation value LVC(T) by using the following Equation (7) for setting the time point $T_6$ as the time point $T_{S2}$ in Equation (4):

$$LVC(T)=K_0 \cdot ER(T)+K_U \cdot (T-T_6)-LVC(T_6) \quad (7)$$

When the time point $T_7$ ($=T_6+LVC(T_6)/K_U$) comes and the condition #4 "the level correction amount $(=K_U \cdot (T-T_6)-LVC(T_6))$ has reached 0" is satisfied, the operational mode then transitions to the mode MD1. Thus, the operational mode again returns MD1, the level control part 124 calculates the level designation value LVC(T) at each time point by using the Equation (1) for setting the level reduction correction amount as "0".

Note that FIG. 14 shows the example of the change over time of the level designation value LVC(T), when the rotating speed information ER(T) passes the value $(ER_{C1}+\Delta ER)$ and changes towards the value $ER_{C4}$ ($>ER_{C1}+\Delta ER$). Moreover, FIG. 15 shows the example of the change over time of the level designation value LVC(T), when the rotating speed information ER(T) passes the value $(ER_{C1}-\Delta ER)$ and changes towards the value $ER_{C5}$ ($<ER_{C1}-\Delta ER$).

The digital processing part 120A send to the analog processing part 130 both of the engine-like pseudo sound signal PED as the result of the processing for generation of the engine-like pseudo sound signal PED, and the level designation value LVC as that of the processing for calculation of the level designation value LVC.

The analog processing part 130 receives the engine-like pseudo sound signal PED and the level designation value LVC, both of which are sent from the digital processing part 120A; then it generates the output audio signal AOS. When the output audio signal AOS is generated, the DA conversion part 131 that has received the engine-like pseudo sound signal PED performs DA conversion upon the engine-like pseudo sound signal PED in the analog processing part 130. The DA conversion part 131 sends the signal converted to analog as the result of the DA conversion to the level adjustment part 132 (refer to FIG. 6).

The level adjustment part 132, which receives the analog converted signal sent from the DA conversion part 131, performs level adjustment processing upon the analog converted signal according to the level designation value LVC sent from the digital processing part 120A. The level adjustment part 132 then sends the signal as the result of the level adjustment processing to the power amplification part 133 (refer to FIG. 6).

The power amplification part 133, which receives the level adjusted signal sent from the level adjustment part 132, performs power amplification of the signal. The power amplification part 133 then sends the output audio signal AOS as the result of the power amplification to the speaker 140.

The speaker 140, which receives the output audio signal AOS sent from the analog processing part 130, outputs engine-like pseudo sound according to the output audio signal AOS. As a result, engine-like pseudo sound is outputted based on the measurement result by the vehicle speed sensor 910.

As has been explained above, in the first embodiment, the acquisition part 110A acquires the result of measurement by the vehicle speed sensor 910 and the result of measurement by the acceleration sensor within the acquisition part 110A as traveling information that reflects the operational state of the drive mechanism of the vehicle CR. The derivation part 122A, which receives these obtained results, derives the accelerator information AR corresponding to the accelerator opening angle, based on the vehicle speed information and the acceleration information. Moreover, the derivation part 122A derives the rotating speed information ER corresponding to the engine rotating speed, based on the vehicle speed information, referring to the gear shift table GST within the storage part 121A.

Subsequently, the generation part 123 refers to the waveform table WFT in the storage part 121A based on both of the derived accelerator information AR and the rotating speed information ER to specify the waveform pattern corresponding to the combination of accelerator information AR and rotating speed information ER. The generation part 123 generates an engine-like pseudo sound signal having the specified waveform pattern.

On the other hand, the level control part 124 calculates the level designation value LVC based on the derived rotating speed information. When the level designation value LVC is calculated, if the rotating speed information ER is continuously changed within the predetermined range over the predetermined time period $T_{TH}$, the level control part 124 reduces the output sound level at the time rate of change "$-K_D$" by increasing the level reduction correction amount by the time rate of change "$K_D$" (>0) for setting the maximum reduction correction amount $\Delta VC$ (>0) as a limit.

Therefore, according to the first embodiment, it is possible to prevent the occurrence of a sense of discomfort caused by non-stop ringing engine-like pseudo sound having the same waveform with a certain volume in the passenger compartment, even when the vehicle CR is traveling.

Furthermore, the continuously change of the rotating speed information ER within the predetermined range for the predetermined time period causes increase of the level reduction correction. In that case, the amount of the level reduction correction is increased comparatively slowly as the same as that of the first embodiment. As a result, the occurrence of a sense of discomfort caused by the change of the level reduction correction amount is prevented.

Moreover, when the change of the rotating speed information ER goes outside the predetermined range during the level reduction correction is being performed, the output sound level is increased. In this case, the level reduction correction amount at the time point is taken as an initial value, and the level reduction correction amount at the time rate of change "$-K_U$" (where $K_U > K_D$); then, the level reduction correction amount is increased at the time rate of change "$K_D$". As a result, the running state of the vehicle CR changes and it sometimes becomes necessary to provide a driving sensation by engine-like pseudo sound. In this case, the level of the engine-like pseudo sound may be returned to the level corresponding to the vehicle speed without the level reduction correction.

The Second Embodiment

Figure 16:
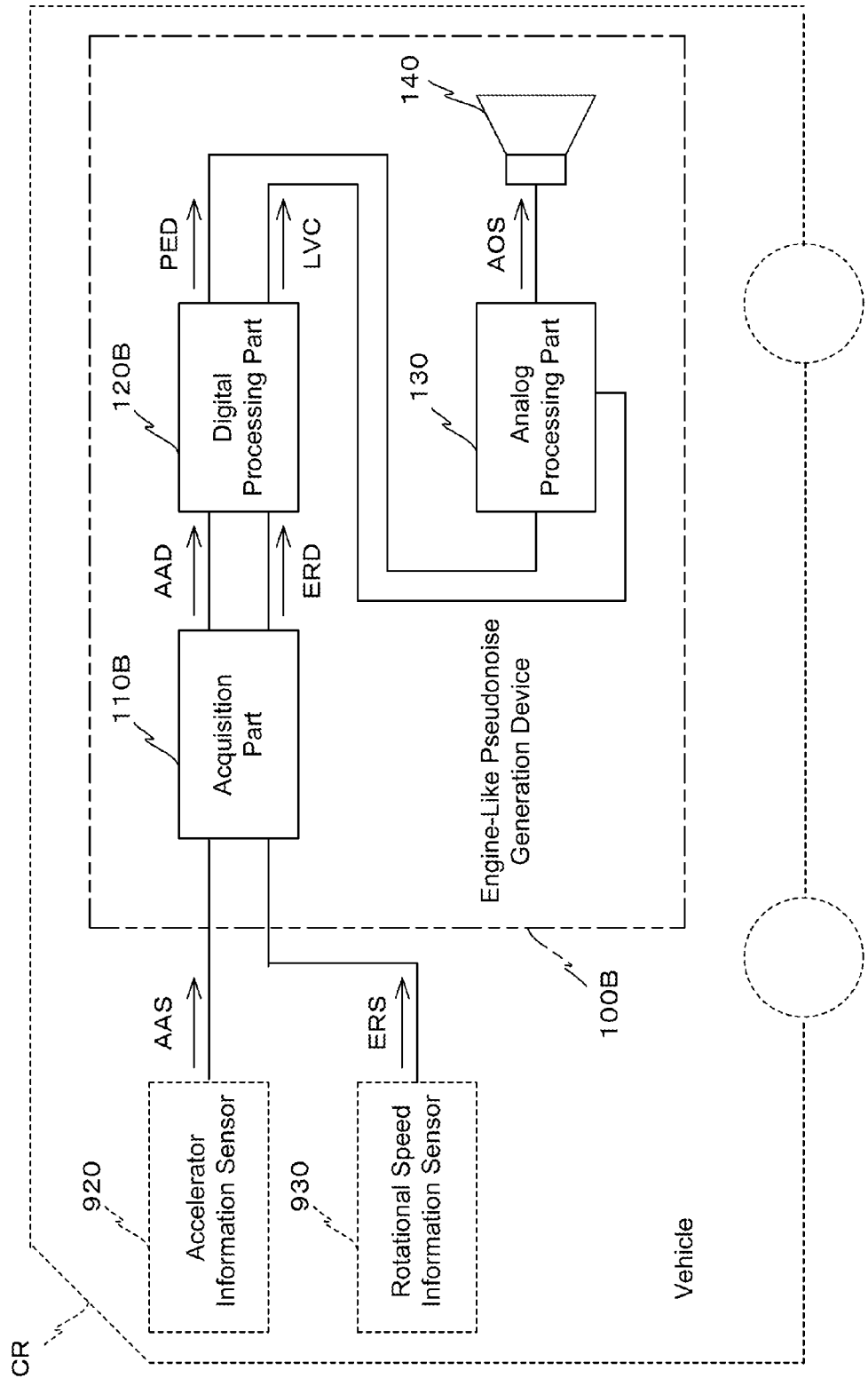
FIG. 16 is a block diagram schematically shoving the structure of an engine-like pseudo sound generation device according to the second embodiment of the present invention.

Next, the second embodiment of the present invention will be explained with reference principally to FIGS. 16 and 17. Also in the second embodiment, similarly to the case for the first embodiment, the engine-like pseudo sound generation device will be shown and explained as an example.
Configuration The configuration of the engine-like pseudo sound generation device 100B according to the second embodiment is schematically shown in FIG. 16. As shown in the FIG. 16, the device 100B has differences that it has the acquisition part 110B and digital processing part 120B instead of the acquisition part 110A and the digital processing part 120A, respectively. The following explanation will be principally focused on these points of difference.

The acquisition part 110B receives the measurement signal AAS sent from the accelerator information sensor 920 provided to the vehicle CR, and the measurement signal ERS sent from the rotating speed information sensor 930. The acquisition part 110B converts the measurement signal AAS into a signal AAD having processable format in the digital processing part 120B to send it to the digital processing part 120B. Moreover, the acquisition part 110B converts the measurement signal ERS into the signal ERD having the processable format in the digital processing part 120B to send it to the digital processing part 120B.

Note that a detector harness is plugged to a signal harness in the second embodiment. In order to supply the measurement signals AAS and ERS to the acquisition part 110B, the signal harness connects the accelerator information sensor 920 such as an opening amount sensor and the like for an accelerator provided to the vehicle CR and the rotating speed information sensor 930 for engine rotating speed or the like to an ECU (Electrical Control part) controlling the traveling of the vehicle CR; or the output harness, which is extended from the ECU towards add-on on-vehicle devices, connects to the engine-like pseudo sound generation device 100B

Figure 17:
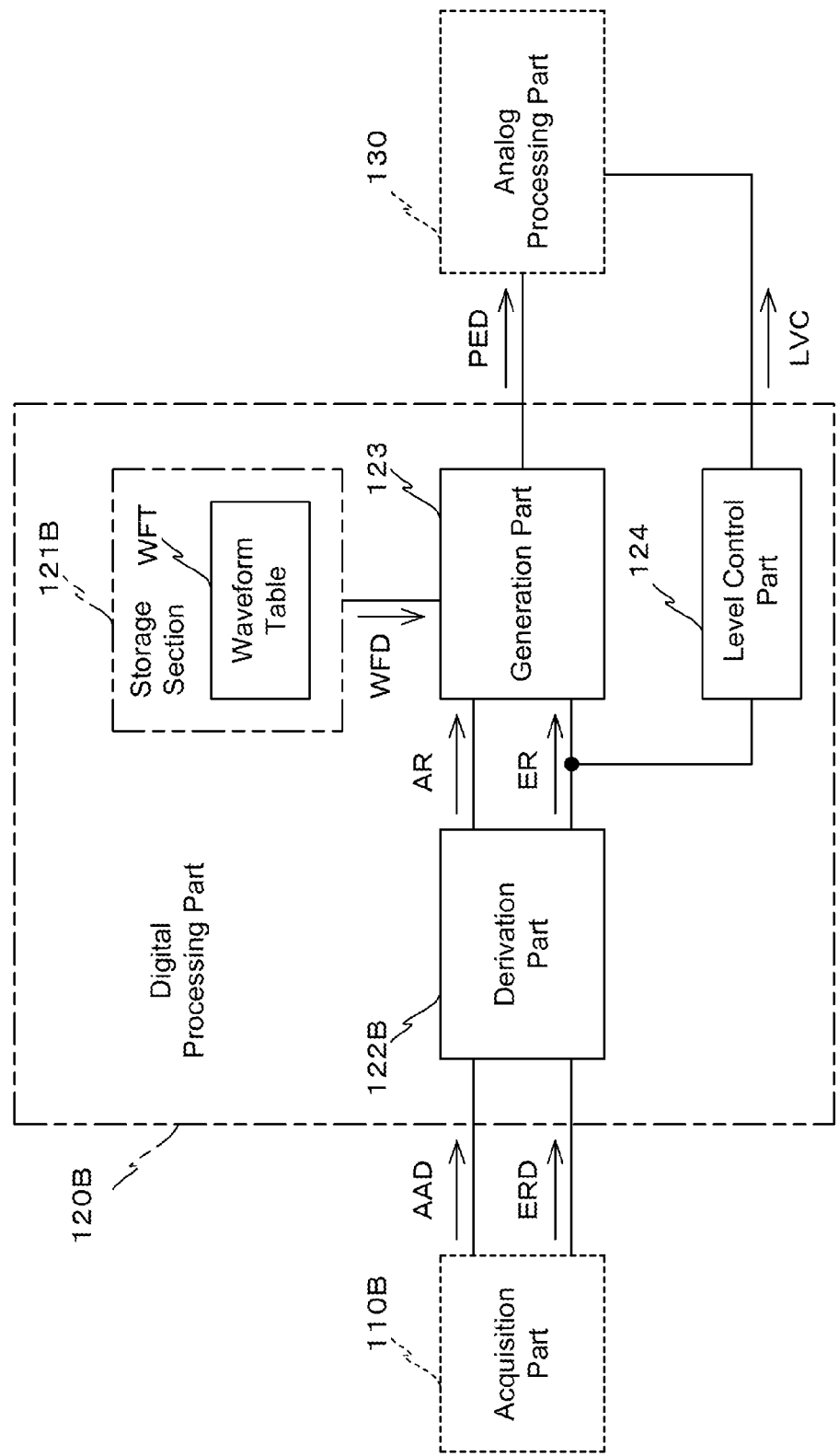
FIG. 17 is a block diagram showing the structure of a digital processing part of FIG. 16.

As shown in FIG. 17, the digital processing part 120B is different from the digital processing part 120A at the point that it has a storage part 121B and a derivation part 122B, instead of the storage part 121A and the derivation part 122A.

The storage part 121B is different from the storage part 121A at the point that it does not store any gear shift table GST. Furthermore, the derivation part 122B is different from the derivation part 122A at the points, wherein it derives the accelerator information AR only based on the signal AAD sent from the acquisition part 110B without referring the gear shift table GST and the rotating speed information ER only based on the signal ERD sent from the acquisition part 110B.
Operation Next, the operation of the engine-like pseudo sound generation device 100B having the configuration as described above will be explained, mainly focusing the processing in the digital processing part 120B.

In the engine-like pseudo sound generation device 100B, the acquisition part 110B receives the measurement signal AAS sent from the accelerator information sensor 920 and the measurement signal ERS sent from the rotating speed information sensor 930. The acquisition part 110B then generates the signal AAD, which is converted from the measurement signal AAS, having the processable format in the digital processing part 120B and the signal ERD, which is converted from the measurement signal ERS, having the processable format in the digital processing part 120B. The acquisition part 110B sends the signal AAD and ERD to the digital processing part 120B (refer to FIG. 16).

The derivation part 122B receives the signals AAD and ERD sent from the acquisition part 110B; then it derives the accelerator information AR based on the signal AAD, and also derives the rotating speed information ER based on the signal ERD. The derived accelerator information AR is sent to the generation part 123, as the same as that of the first embodiment. Moreover, the rotating speed information ER is sent to the generation part 123 and to the level control part 124, as the same as those of the first embodiment (refer to FIG. 17).

The generation part 123 received the accelerator information AR and the rotating speed information, both of which are newly derived by the derivation part 122B. The generation part 123 then performs similar processing to the processing of FIG. 9 to generate engine-like pseudo sound signal PED, as the same as of the first embodiment. Thus generated engine-like pseudo sound signal PED is sent to the analog processing part 130 (refer to FIG. 17).

Furthermore, the level control part 124 receives the rotating speed information newly derived by the derivation part 122B. The level control part 124 performs similar processing to the processing of FIGS. 10 through 15, and calculates a level designation value LVC, as the same as that of the first embodiment. Thus newly calculated level designation value LVC is sent to the analog processing part 130 (refer to FIG. 17).

The analog processing part 130 receives the engine-like pseudo sound signal PED and the level designation value LVC, both of which were sent from the digital signal processing part 120B. The analog processing part 130 then generates an output audio signal AOS, as the same as those of the first embodiment. Thus generated output audio signal AOS is sent to the speaker 140 (refer to FIG. 16).

The speaker 140 receives the output audio signal AOS sent from the analog processing part 130, and then it outputs engine-like pseudo sound according to the output audio signal AOS. As a result, engine-like pseudo sound, which is generated based on the results of measurement by the accelerator information sensor 920 and the rotating speed information sensor 930, is output.

As has been explained above, in the second embodiment, the acquisition part 110B acquires the results of measurement by the accelerator information sensor 920 and the rotating speed information sensor 930 as traveling information that reflects the operational state of the drive mechanism of the vehicle CR. The derivation part 122B receives the acquired results, and then it derives the accelerator information AR corresponding to the accelerator opening angle based on the accelerator information sensor 920. Moreover, the derivation part 122B derives the rotating speed information ER corresponding to the engine rotating speed based on the result of measurement from the rotating speed information sensor 930.

Subsequently, the generation part 123 refers to the waveform table WFT in the storage part 121B. The generation part 123 then specifies the waveform pattern that corresponds to the combination of the accelerator opening angle AR and the rotating speed information ER based on the accelerator information AR and rotating speed information ER, as the same as the first embodiment. The generation part 123 generates an engine-like pseudo sound signal PED having the specified waveform pattern.

On the other hand, the level control part 124 calculates the level designation value LVC based on the derived rotating speed information ER, as the same as that of the first embodiment. If the rotating speed information ER changes within the predetermined range for a predetermined time period $T_{TH}$ on the calculation of the level designation value LVC, the level control part 124 reduces the output sound level, as the same as that of the first embodiment. Wherein the level control part 124 reduces the output sound level at the time rate of change "$-K_D$", by increasing the level reduction correction amount at the time rate of change "$K_D$" (>0) as the maximum reduction correction amount $\Delta VC$(>0) as a limit.

Therefore, according to the second embodiment, it is possible to prevent the occurrence of a sense of discomfort caused by non-stop ringing engine-like pseudo sound having the same waveform with a certain volume in the passenger compartment, even when the vehicle CR is traveling.

Furthermore, the continuously change of the rotating speed information ER within the predetermined range for the predetermined time period causes increase of the level reduction correction. In that case, the amount of the level reduction correction is increased comparatively slowly as the same as that of the first embodiment. As a result, the occurrence of a sense of discomfort caused by the change of the level reduction correction amount is prevented.

Moreover, when the change of the rotating speed information ER goes outside the predetermined range during the level reduction correction is being performed, the output sound level is increased. In this case, the level reduction correction amount at the time point is taken as an initial value, and the level reduction correction amount at the time rate of change "$-K_U$" (where $K_U$>$K_D$); then, the level reduction correction amount is increased at the time rate of change "$K_D$". As a result, the running state of the vehicle CR changes and it sometimes becomes necessary to provide a driving sensation by engine-like pseudo sound. In this case, the level of the engine-like pseudo sound may be returned to the level corresponding to the vehicle speed without the level reduction correction.

Modification of the Embodiments

The present invention is not limited to the above-mentioned embodiments, and a variety of the modifications are possible.

In the first embodiment, it is arranged to measure the acceleration of the vehicle CR with an acceleration sensor in the first example. However, for example, it may be arranged to calculate the acceleration of the vehicle CR from the change over time of the speed of the vehicle CR.

Furthermore, it is arranged to supply the measurement signal sent from the accelerator information sensor 920, which is equipped to the vehicle CR as standard and utilized for travel control of the vehicle CR, to the engine-like pseudo sound generation device 100B by using a detection harness in the first embodiment. In contrast, it may be used the measurement result by using the accelerator stepping-on amount sensor, which is prepared separately from the accelerator information sensor 920, instead of that by using the accelerator information sensor 920.

Furthermore, it was arranged to solely employ the vehicle speed sensor 910 as the sensor provided to the vehicle CR as standard in the first embodiment. However, if either of the accelerator information sensor 920 or the rotating speed information sensor 930 is easily used, it may be simplify to derive either of the accelerator information AR or the rotating speed information ER by utilizing both of these usable sensors.

Furthermore, it was arranged to increase the level designation value by changing the level reduction correction amount at a constant time rate of change (=$-K_U$) during the operation of the level control part 124 in the mode MD4 in the first and second embodiments. In contrast, it may be arranged to increase the level designation value at a constant rate of change by reaching a level designation value at which no level reduction correction is performed.

Furthermore, it was arranged to increase the level designation value by changing the level reduction correction amount at a constant time rate of change (=$-K_U$) at the predetermined value $\Delta VC$ during the operation of the level control part 124 in the mode MD1 in the first and second embodiments. In contrast, it may be arranged to reduce the level designation value at a constant rate of change by setting a predetermined value as a limit.

Furthermore, the present invention has been applied to the generation of engine-like pseudo sound in the first and second embodiments. However, the present invention can be applied to the generation of pseudo sound of which timbre is different from that of engine-like pseudo sound, for example, such as the traveling noise from a train car traveling on a railway or the like.

Note that it may be possible to compose the digital processing part in the first and second embodiments as a computer system, which comprises a central processor unit (CPU: Central Processor Unit), a DSP (Digital Signal Processor) and the like. By this, it is possible to implement the functions of the digital processing part by executing programs. These programs may be acquired in a format recorded on a transportable recording medium such as a CD-ROM, a DVD or the like, or in a format distributed via a network such as Internet or the like.

The invention claimed is:

1. A pseudo sound generation device mounted to a vehicle that is equipped with a drive mechanism, comprising:
   an acquisition part that acquires traveling information reflecting the operational state of said drive mechanism;
   a derivation part that derives pseudo sound-related information on the basis of said acquired traveling information, including rotating speed information of said drive mechanism, which is corresponding to engine rotating speed when said drive mechanism is an engine;
   a generation part that generates a pseudo sound signal having a waveform corresponding to said derived pseudo sound-related information;
   a control part that performs a reduction designation to reduce the level of said pseudo sound signal at a first time rate of change, when said operational state is a constant rotating speed state, in which said rotating speed information included in said derived pseudo sound-related information is changed within a predetermined range, continued over a predetermined time period after said constant rotating speed state begins;
   an adjustment part that adjusts the level of said pseudo sound signal according to a designation from said control part; and
   a speaker that outputs pseudo sound according to the pseudo sound signal of which level has been adjusted by said adjustment part.

2. A pseudo sound generation device according to claim 1, wherein said control part increases the level of said pseudo sound signal at a second time rate of change if said rotating speed information included in said derived pseudo sound-related information gets out of said predetermined range after said reduction designation.

3. A pseudo sound generation device according to claim 2, wherein the absolute value of said second time rate of change is larger than that of said first time rate of change.

4. A pseudo sound generation device according to claim 1, wherein said reduction designation is a designation for said adjustment part to reduce the level of the pseudo sound signal by just a predetermined value.

5. A pseudo sound generation device according to claim 1, wherein said reduction designation is a designation for said adjustment part to reduce the level of the pseudo sound signal down to a predetermined value.

6. A pseudo sound generation device according to claim 1, wherein said pseudo sound-related information further comprises accelerator information corresponding to accelerator opening amount.

7. A pseudo sound generation device according to claim 6, wherein:
   said traveling information includes vehicle speed; and
   said derivation part that performs:
      derivation of vehicle acceleration on the basis of said acquired vehicle speed; and
      derivation of said accelerator information on the basis of said acquired vehicle speed and said derived vehicle acceleration.

8. A pseudo sound generation device according to claim 6, wherein
   said traveling information is included in vehicle speed and vehicle acceleration; and
   said derivation part derives said accelerator information on the basis of said acquired vehicle speed and vehicle acceleration.

9. A pseudo sound generation device according to claim 1, characterized in that:
   said traveling information includes vehicle speed; and
   said derivation part derives said rotating speed information on the basis of said acquired vehicle speed.

10. A pseudo sound generation device according to claim 9 further comprising a first storage part that stores said vehicle speed is mutually connected with gear shift position; and
   said derivation part derives said rotating speed information further considering the gear shift position being connected with said vehicle speed acquired in said first storage part.

11. A pseudo sound generation device according to claim 1 further comprising a second storage part that stores said pseudo sound-related information is mutually connected with waveform information for said pseudo sound signal; and
   said generation part generates said pseudo sound signal by referring to said second storage part.

12. A pseudo sound generation method employed in a pseudo sound generation device mounted to a vehicle, which comprising a drive mechanism and an adjustment part configured to adjusts the level of a pseudo sound signal according to a level designation and a speaker configured to output pseudo sound according to the pseudo sound signal of which level has been adjusted by said adjustment part comprising the steps of:
   acquiring traveling information reflecting the operational state of said drive mechanism;
   deriving pseudo sound-related information of said drive mechanism on the basis of said acquired traveling information, including rotating speed information, which is corresponding to engine rotating speed when said drive mechanism is an engine;
   generating a pseudo sound signal having a waveform corresponding to said derived pseudo sound-related information; and
   controlling a level of said pseudo sound signal by performing a reduction designation to reduce the level at a first time rate of change, when said operation state is a constant rotating speed state, in which said rotating speed information included in said derived pseudo sound-related information is changed within a predetermined range, continued over a predetermined time period after said constant rotating speed state begins.

13. A non-transitory computer-readable recording medium having recorded thereon a pseudo sound generation program that, when executed, causes a calculation part to execute the pseudo sound generation method comprising:
   acquiring traveling information reflecting the operational state of said drive mechanism;
   deriving pseudo sound-related information of said drive mechanism on the basis of said acquired traveling information, including rotating speed information, which is corresponding to engine rotating speed when said drive mechanism is an engine;
   generating a pseudo sound signal having a waveform corresponding to said derived pseudo sound-related information; and
   controlling a level of said pseudo sound signal by performing a reduction designation to reduce the level at a first time rate of change, when said operation state is a constant rotating speed state, in which said rotating speed information included in said derived pseudo sound-related information is changed within a predetermined range, continued over a predetermined time period after said constant rotating speed state begins.

\* \* \* \* \*